United States Patent Office 3,330,795
Patented July 11, 1967

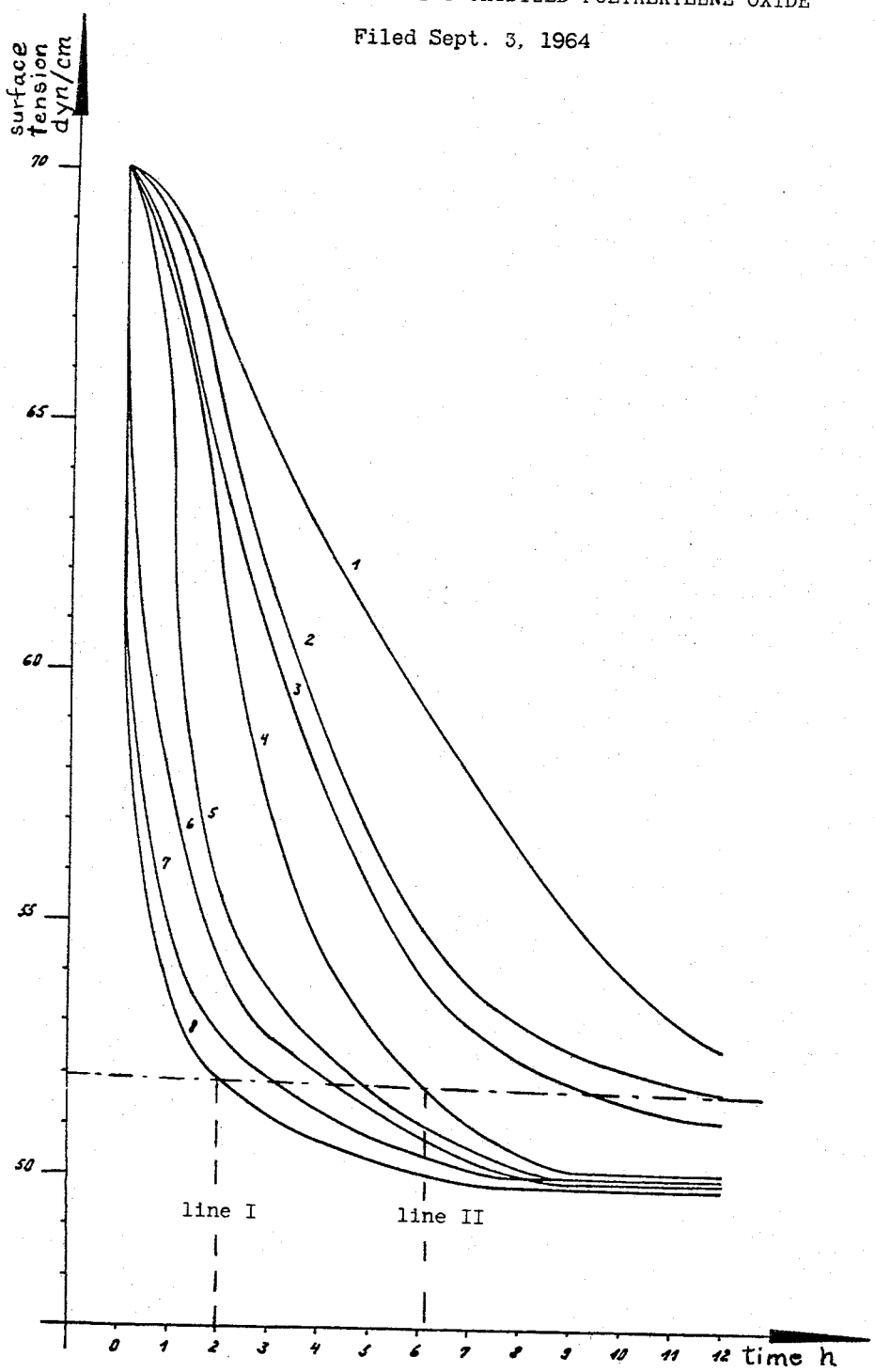

3,330,795
LATEX AGGLOMERATION USING OXIDIZED POLYALKYLENE OXIDE
Herbert Schlüter, Marl, Germany, assignor to Chemische Werke Huls Aktiengesellschaft, Marl Kreis Recklinghausen, Germany, a corporation of Germany
Filed Sept. 3, 1964, Ser. No. 394,117
Claims priority, application Germany Dec. 5, 1963, C 31,587
5 Claims. (Cl. 260—29.7)

It is known that the solid particles of synthetic rubber dispersions can be agglomerated by the addition of from 0.01 to 2% of a polyalkylene oxide having a molecular weight between 3000 and 30,000. Synthetic rubber dispersions containing such polyalkylene oxide additions can be concentrated to low viscosity synthetic rubber dispersions having high solids contents without coagulation or gelation.

It has now been found that the solid particles of synthetic rubber dispersions can be agglomerated more advantageously by the addition of oxidized polyethylene oxides having molecular weights between 3000 and 30,000.

Suitable polyalkylene oxides are e.g. polymers of ethylene oxide, propylene oxide and their mixed polymers and also their esters, ethers and other derivatives the OH groups of which are readily accessible by reaction. The molecular weight of the polyalkylene oxides are within the range of from 3000 to 30,000 and preferably 10,000 to 15,000. The molecular weight is determined by the determination of the end group (OH—number) in accordance with the method of M. Freed and A. M. Wynne (Zietschrift fur analytische Chemie 117, page 424, 1939).

Suitable oxidation agents are, e.g., air, especially in the presence of a small amount of an organic or inorganic acid such as glacial acetic acid, formic acid or boric acid, and also oxidizing agents which readily liberate oxygen such as hydrogen peroxide or oxidizing agents derived from hte oxygen acids of chlorine such as chlorates, perchlorates and hypochlorates especially in the presence of the above mentioned acids.

The treatment with the oxidizing agent can be carried out as follows. The polyalkylene oxide is heated to a temperature which is above its melting point (about 80–200° C.) and the oxidizing agent is introduced into the thinly liquid melt with stirring. If air is used as the oxidizing agent it can be supplied from a pressure vessel. Otherwise it is possible to stir atmospheric air from the atmosphere above the reaction vessel into the melt by means of a suitable stirrer. The oxidation advantageously is stopped when the desired agglomeration activity has been reached. This normally occurs when the C=O group content of the polyalkylene oxide is between 0 and 8% and preferably between 0 and 2%. The activity remains even after hydrogenation.

The oxidized polyalkylene oxide may be added, preferably in amounts from .0001 to 2% to synthetic rubber dispersions which have been produced by emulsion polymerization of diolefines such as butadiene or substituted butadienes such as isoprene and chlorobutadiene and also mixtures of these diolefines with vinyl compounds such as styrene, acrylonitrile, acrylamide and vinylpyridine. The oxidized polyalkylene oxides are especially useful for the agglomeration of dispersions of mixed polymers of 10 to 50% by weight of a diolefine and 50 to 90% by weight of styrene, preferably 10 to 30% by weight of the diolefine and 70 to 90% by weight of the styrene, and mixtures of synthetic rubber dispersions with polystyrene dispersions. The dispersions may contain ionogenic compounds such as alkali metal salts of fatty acid, disproportionated resinic acids and alkyl or aralkyl sulfonic acids or the non-ionogenic compounds formed by the addition of ethylene oxide to alcohols which in general have molecular weights within the range from 400 to 2000 as emulsifying or dispersing agents. Advantageously aqueous rubber dispersions are used that have solids contents within the range from 20 to 50%. The oxidized polyalkylene oxides are added to such dispersions as water solutions, if expedient, in admixture with small amounts of electrolytes and condensation products of formaldehyde and naphthalene sulfonic acid. The dispersions can be evaporated with stirring under vacuum at temperatures from 0 to 100° C., preferably 40 to 60° C., to solids contents of from 55 to 72% without loss of the fluidity necessary for further working thereof.

The solid particles of the dispersions increase in size during the evaporation and at the same time the surface tension is reduced 10–25 units. The increase in particle size occurs during the concentration in the solids content range of 35–70%, especially 45–60% and amounts to about from 500 to 10,000 A. (weight average) and 200–2000 A. (number average). The dispersions can be used for the production of foam products or for impregnation as well as for coating and as adhesive.

*Example 1*

400 parts by weight of polyethylene oxide having a molecular weight of 12,000 was melted in a glass container and heated with stirring to 120° C. Then 2 parts by weight of glacial acetic acid was added and 3 m.³ of air was introduced over a period of 180 minutes into the thinly liquid melt with stirring at 120–122° C. Seven examples were withdrawn at 20, 40, 60, 90 120, 150 and 180 minutes.

A synthetic rubber dispersion was made by redox polymerization at 5° C. of 69 parts by weight of butadiene and 31 parts by weight of styrene in the presence of 2.3 parts by weight of potassium oleate, 0.14 part by weight of tripotassium phosphate, 0.3 part by weight of potassium chloride and 180 parts by weight of desalted water to a conversion of 63%. After separation of the remaining monomers the 25% latex, after the addition of 0.075 part by weight of potassium sulfate and 0.125 part by weight of a condensation product of formaldehyde and naphthalene sulfonic acid was concentrated to a solids content of 42% and divided into eight equal samples. Then 0.084 part by weight of each of the oxidized polyethylene oxide samples was added to seven of the samples of the dispersion and each of the resulting mixtures was heated under a reflux cooler for 2 hours at 60° C. and then for 10 hours at 80° C. The change in surface tension was measured hourly.

The results of the above described tests are shown in the following Table 1 and by the curves in the accompanying drawing. In the table the left hand vertical column is a list of the numbers of hours the mixtures of synthetic rubber dispersion and oxidized polyethylene oxide were heated and the top horizontal column is a list of the times that the oxidized polyethylene oxide samples were treated with air. The polyethylene oxide was treated with air at the rate of 1 m.³/h. at 120–122° C. The other vertical columns of the table show the surface tension measurements in dynes per centimeter and correspond to curves 1 to 8 on the drawing.

Table 1 and the drawing show that with increasing degree of oxidation of the polyethylene oxide the gradient angle of curves 1 and 8 increases and the desired agglomeration speed increases. The end surface tension produced by the agglomeration is not at all or not substantially affected by the oxidation of the polyalkylene oxide (see curves 4–8 in the region 8–12 hours). In other words an oxidized polyethylene oxide corresponding to curve 8 causes an agglomeration in about 2 hours corresponding to a decrease of 18 units of the surface tension (see line I). In comparison therewith an oxidized polyethylene oxide according to curve 4 causes an agglomeration in about 6 hours (see line II). The higher is the degree of oxidation of the polyethylene oxide the faster is the agglomeration caused by the polyethylene oxide.

perature of 150–180° C. and oxidized with air for 120 minutes according to Example 1, was heated to 100° C. The surface tension of the resulting heated latex was then measured hourly for 12 hours and the surface tension values are given in the following Table II.

TABLE II

| Hours | Surface tension values (dyn./cm.) | |
|---|---|---|
|  | A | B |
| 0 | 70.0 | 70.0 |
| 1 | 67.9 | 53.3 |
| 2 | 67.1 | 50.4 |
| 3 | 66.5 | 49.6 |
| 4 | 66.0 | 49.3 |
| 5 | 65.7 | 49.2 |
| 6 | 65.4 | 49.2 |
| 7 | 65.3 | 49.2 |
| 8 | 65.2 | 49.2 |
| 9 | 65.1 | 49.2 |
| 10 | 65.0 | 49.2 |
| 11 | 65.0 | 49.2 |
| 12 | 65.0 | 49.2 |

TABLE I.—SURFACE TENSION

| Time | Curve 1, dyn./cm. | 20 min. Curve 2, dyn./cm. | 40 min. Curve 3, dyn./cm. | 60 min. Curve 4, dyn./cm. | 90 min. Curve 5, dyn./cm. | 120 min. Curve 6, dyn./cm. | 150 min. Curve 7, dyn./cm. | 180 min. Curve 8, dyn./cm. |
|---|---|---|---|---|---|---|---|---|
| 0 | 70.0 | 70.0 | 70.0 | 70.0 | 70.0 | 70.0 | 70.0 | 70.0 |
| 1 | 69.2 | 68.8 | 67.8 | 67.5 | 65.0 | 56.6 | 54.7 | 53.3 |
| 2 | 66.8 | 65.0 | 63.5 | 62.0 | 55.4 | 54.0 | 52.8 | 51.9 |
| 3 | 64.5 | 61.7 | 60.5 | 57.0 | 53.6 | 52.7 | 51.8 | 51.2 |
| 4 | 62.6 | 59.0 | 58.0 | 54.5 | 52.5 | 51.9 | 51.3 | 50.7 |
| 5 | 61.0 | 56.6 | 55.6 | 52.9 | 51.7 | 51.3 | 50.7 | 50.3 |
| 6 | 59.3 | 54.9 | 54.0 | 51.7 | 51.0 | 50.8 | 50.4 | 50.1 |
| 7 | 57.8 | 53.7 | 52.9 | 51.0 | 50.6 | 50.4 | 50.2 | 49.9 |
| 8 | 56.4 | 52.9 | 52.2 | 50.5 | 50.3 | 50.2 | 50.0 | 49.8 |
| 9 | 55.1 | 52.4 | 51.8 | 50.1 | 50.0 | 49.9 | 50.0 | 49.8 |
| 10 | 54.0 | 52.1 | 51.5 | 50.1 | 50.0 | 49.9 | 50.0 | 49.8 |
| 11 | 53.2 | 51.9 | 51.2 | 50.1 | 50.0 | 49.9 | 50.0 | 49.8 |
| 12 | 52.5 | 51.7 | 51.1 | 50.1 | 50.0 | 49.9 | 50.0 | 49.8 |

*Example 2*

(A) A synthetic rubber dispersion having a solids content of 42% was made by redox polymerization of 69 parts by weight of butadiene and 31 parts by weight of styrene in the presence of 2.3 parts by weight of potassium oleate, 0.5 part by weight of a condensation product of formaldehyde and naphthalene sulfonic acid, 0.14 part by weight of potassium sulfate, 0.3 part by weight of potassium chloride and 180 parts by weight of desalted water at 5° C. to a conversion of 65%, separation of the residual monomers and concentration. 100 parts by weight of said 42% synthetic rubber dispersion was mixed with 12 parts by weight of a polystyrene dispersion made by the polymerization of 100 parts by weight of styrene in the presence of 5 parts by weight of potassium oleate and 0.15 part by weight of potassium persulfate at 50° C. and concentration to a solids content of 42%. The resulting mixture of synthetic rubber dispersion and polystyrene dispersion was mixed with 0.09 part by weight of a polyethylene glycol having a molecular weight of 12,000, produced by the stepwise polyaddition of ethylene oxide to ethylene glycol or polyethylene glycol in the presence of 0.2% of sodium hydroxide at a temperature of 150–180° C., and 0.023 part by weight of potassium sulfate and the resulting mixture was heated to 100° C. and the surface tension was measured hourly over a period of 12 hours. The measurements are given in Table II below.

(B) 100 parts by weight of the mixed dispersion described under A above with the addition of 0.023 part by weight of potassium sulfate and 0.09 part by weight of an oxidized polyethylene glycol having a molecular weight of 12,000, made by the stepwise polyaddition of ethylene oxide to ethylene glycol or polyethylene glycol in the presence of 0.2% of sodium hydroxide at a tem-

*Example 3*

400 parts by weight of polyalkylene oxide having a molecular weight of 12,000 made by the stepwise polyaddition of ethylene oxide and propylene oxide in the ratio of 3:1 to ethylene glycol in the presence of 0.2% of sodium hydroxide at a temperature of 130° C. was melted in a glass container. After the addition of 2 parts by weight of glacial acetic acid the mixture was heated to 180° C. Air was stirred into the thinly liquid melt by a high speed stirrer having a peripheral speed of about 15–20 cm./sec. After 3, 5 and 7 hours samples A, B and C were withdrawn from the melt. A synthetic rubber dispersion having a solids content of 42% was made by redox polymerization at 5° C. of 69 parts by weight of butadiene and 31 parts by weight of styrene in the presence of 2.3 parts by weight of potassium oleate, 0.5 part by weight of a condensation product of formaldehyde and naphthalene sulfonic acid, 0.14 part by weight of potassium persulfate, 0.3 part by weight of potassium chloride and 180 parts by weight of fully desalted water to a conversion of 65%, separating residual monomer and concentration. 100 parts by weight of this dispersion was mixed with 16 parts by weight of a 42% Duranit depression which was made by the polymerization of 90 parts by weight of styrene and 10 parts by weight of butadiene at 50° C. in the presence of 4 parts by weight of potassium oleate and 0.15 part by weight of potassium persulfate to a conversion of 100%. After the addition of 0.09 part by weight of the unoxidized polyalkylene glycol having a molecular weight of 12,000 (sample 0) and 0.023 part by weight of potassium sulfate the mixed dispersion was held for 2 hours at 60° C. and for 10 hours at 80° C. The surface tension was measured hourly. 100 parts by weight of this mixed dispersion with the addition of 0.023 part by weight of potassium sulfate and 0.09 part by weight of sample A was held for 2 hours at 60° C. and for 10 hours at 80° C. The surface tension was measured hourly. 100 parts by weight of the mixed dispersion with the addition of 0.023 part by weight of potassium sulfate and 0.09 part by weight of sample B was held for 2 hours at 60° C., and for 10 hours at 80° C. The surface tension was measured hourly. 100 parts by weight of the mixed dispersion with the addition of 0.023 part by weight of potassium sulfate and 0.09 part by weight of sample C was held for 2 hours at 60° C. and for 10 hours at 80° C. The surface tension was measured hourly.

The surface tension values are given in the following Table III.

TABLE III

| Hours | Surface tension values (dyn./cm.) | | | |
|---|---|---|---|---|
| | O | A | B | C |
| 0 | 70 | 70 | 70 | 70 |
| 1 | 70 | 65.6 | 63.0 | 53.6 |
| 2 | 69.8 | 65.2 | 61.1 | 52.6 |
| 3 | 69.6 | 63.2 | 58.9 | 52.3 |
| 4 | 69.4 | 62.0 | 57.0 | 50.3 |
| 5 | 69.2 | 61.4 | 55.8 | 50.2 |
| 6 | 68.0 | 60.9 | 55.0 | 49.2 |
| 7 | 67.1 | 60.8 | 54.5 | 47.8 |
| 8 | 66.5 | 60.4 | 53.8 | 47.0 |
| 9 | 66.1 | 60.0 | 52.8 | 46.8 |
| 10 | 65.0 | 59.6 | 52.0 | 46.7 |
| 11 | 64.0 | 59.3 | 51.0 | 46.6 |
| 12 | 63.8 | 59.0 | 50.2 | 46.6 |

I claim:

1. As a new product a latex consisting assentially of a mixture of a synthetic rubber dispersion and an oxidized polyalkylene oxide having a molecular weight within the range from 3000 to 30,000 and a substantial —C=O— group content of not more than 8%.

2. A new product as defined in claim 1 in which the synthetic rubber dispersion is a dispersion of a mixed polymer of from 10 to 50% by weight of a diolefine and from 50 to 90% by weight of styrene.

3. A new product as defined in claim 1 in which the oxidized polyalkylene oxide is oxidized polyethylene oxide.

4. A new product as defined in claim 1 in which the oxidized polyalkylene oxide is formed by the oxidation of polyethylene oxide with air in the presence of an acid at from 20 to 200° C.

5. A new product as defined in claim 4 in which the oxidation is effected by stirring the polyalkylene oxide in the presence of air and acetic acid at a temperature of about 180° C.

References Cited

FOREIGN PATENTS 1,314,301  11/1962  France.

OTHER REFERENCES

Pearson, R. W.: Chem. Abstracts, vol. 53, September 1959, p. 16100.

St. Pierre et al.: "Room Temp. Polymerization of Propylene Oxide," Journal Amer. Chem. Soc., vol. 78, pp, 3432–3436, 1956.

Sullivan et al.: Ind and Eng Chem., vol 39, No. 1, p. 1614 (1947).

Patent Abstract 63, 189/60, February, 1961.

MURRAY TILLMAN, *Primary Examiner.*

J. T. GOOLKASIAN, J. ZIEGLER, *Assistant Examiners.*